United States Patent
Hsu et al.

(10) Patent No.: US 10,762,101 B2
(45) Date of Patent: Sep. 1, 2020

(54) SINGULAR VALUE DECOMPOSITIONS

(71) Applicant: HEWLETT PACKARD ENTERPRISE DEVELOPMENT LP, Houston, TX (US)

(72) Inventors: Meichun Hsu, Sunnyvale, CA (US); Lakshminarayan Choudur, Austin, TX (US)

(73) Assignee: MICRO FOCUS LLC, Santa Clara, CA (US)

( * ) Notice: Subject to any disclaimer, the term of this patent is extended or adjusted under 35 U.S.C. 154(b) by 959 days.

(21) Appl. No.: 15/340,218

(22) Filed: Nov. 1, 2016

(65) Prior Publication Data
US 2018/0121527 A1 May 3, 2018

(51) Int. Cl.
*G06F 16/25* (2019.01)
*G06F 16/215* (2019.01)

(52) U.S. Cl.
CPC .......... *G06F 16/258* (2019.01); *G06F 16/215* (2019.01)

(58) Field of Classification Search
USPC ........................................................ 707/756
See application file for complete search history.

(56) References Cited

U.S. PATENT DOCUMENTS

2009/0216821 A1* 8/2009 Nakamura ........... G06K 9/6247
708/446
2010/0030764 A1* 2/2010 Koren ................ G06Q 30/0201
705/7.29
2016/0364327 A1* 12/2016 Reinwald ................ G06F 17/16
2017/0075980 A1* 3/2017 Charron ................ G06F 16/285
2017/0076299 A1* 3/2017 Modarresi .......... G06Q 30/0202

OTHER PUBLICATIONS

"Michael E. Berry, Dani Mezher, Bernard Philippe, and Ahmed Sameh, Parallel Algorithms for Singular Value Decomposition, 2005" (Year: 2005).*
Ding et al., A Parallel Implementation of Singular Value Decomposition based on Map-Reduce and PARPACK, 2011 (Year: 2011).*
Hernandez et al., A Scalable and Flexible Toolkit for the Solution of Eigenvalue Problems, 2004 (Year: 2004).*
Chakroborty et al., Feature selection using singular value decomposition and QR factorization with column pivoting for text-independent speaker identification, 2010 (Year: 2010).*
Unknown, "Lanczos Algorithm", Wikipedia, the free encyclopedia, Retrieved on Feb. 1, 2017, 6 pages.

(Continued)

*Primary Examiner* — Jeff A Burke
*Assistant Examiner* — John J Morris

(57) ABSTRACT

In one example in accordance with the present disclosure, a system comprises a computing node. The computing node comprises: a memory, and a processor to: execute a database in the memory, and invoke, with the database, singular value decomposition (SVD) on a data set. To invoke SVD, the processor may sparsify, with the database, the data set to produce a sparse data set, iteratively decompose, with the database, the data set to produce a set of eigenvalues, solve, with the database a linear system to produce a set of eigenvectors, and multiply, with the database, the eigenvectors with the data set to produce a data set of reduced dimension.

20 Claims, 6 Drawing Sheets

(56) References Cited

OTHER PUBLICATIONS

Unknown, "Singular Value Decomposition", Wikipedia, the free encyclopedia, Retrieved on Feb. 1, 2017, 15 pages.
Unknown, "QR Decomposition", Wikipedia, the free encyclopedia, Retrieved on Feb. 1, 2017, 11 pages.
Eigen C++ library, "is a C++ template library for linear algebra: matrices, vectors, numerical solvers, and related algorithms", retrieved from the internet on Dec. 13, 2019, 13 pages. <http://eigen.tuxfamily.org/index.php?title=Main_Page>.
Larsen et al., "Lanczos bidiagonalization with partial reorthogonalization", Oct. 1998, 90 pages.

* cited by examiner

SINGULAR VALUE DECOMPOSITIONS

BACKGROUND

A database stores data in rows and columns of a table. The database may perform various operations to modify and transform the data stored in the database.

BRIEF DESCRIPTION OF THE DRAWINGS

The following detailed description references the drawings, wherein.

DETAILED DESCRIPTION

Big data, machine learning, and analytics are an increasingly important field within computer science. Databases may store data that is a prime candidate for analysis, and particularly singular value decomposition (SVD) of matrix data. However, databases may lack the capability to perform analytical operations within the database itself. Instead, an analyst wishing to perform analytics may be required to export a data set from a database and import the data into another analysis program, such as R, SAS, MATLAB, or the like. Additionally, current SVD solutions may not scale well for large data sets.

The disclosure describes techniques for enabling a database to perform singular value decomposition in a scalable fashion. SVD is a data analysis technique for extracting useful information from a data set. Currently, databases may lack the capability to invoke SVD in the database itself. Instead, data has to be exported to another tool, such as R, SAS, MATLAB, or the like for processing, and then re-imported back into the database upon completion. Additionally, existing techniques for performing SVD may not scale across multiple compute nodes. The techniques of this disclosure enable a database to invoke SVD on a data set stored in the database by using a combination of SQL statements, linear algebra libraries, and user-defined transform functions. The techniques of this disclosure also allow a database to scale the SVD process across multiple nodes based on a feature size of the database.

More particularly, a database may store data that can be represented as a matrix. However, the size of the matrix may be very large, and an analyst may wish to determine which values of the database are relevant to a particular machine learning problem. To determine which values are relevant for machine learning, various analytical techniques may be applied to the data set to reduce the dimension of the data set.

Databases may also be incapable of natively storing very large matrices for SVD in a single table. The techniques of this disclosure also describe techniques for storing matrix data in a database table, and for converting the data stored in the table to a matrix representation to perform SVD.

Figure 1:
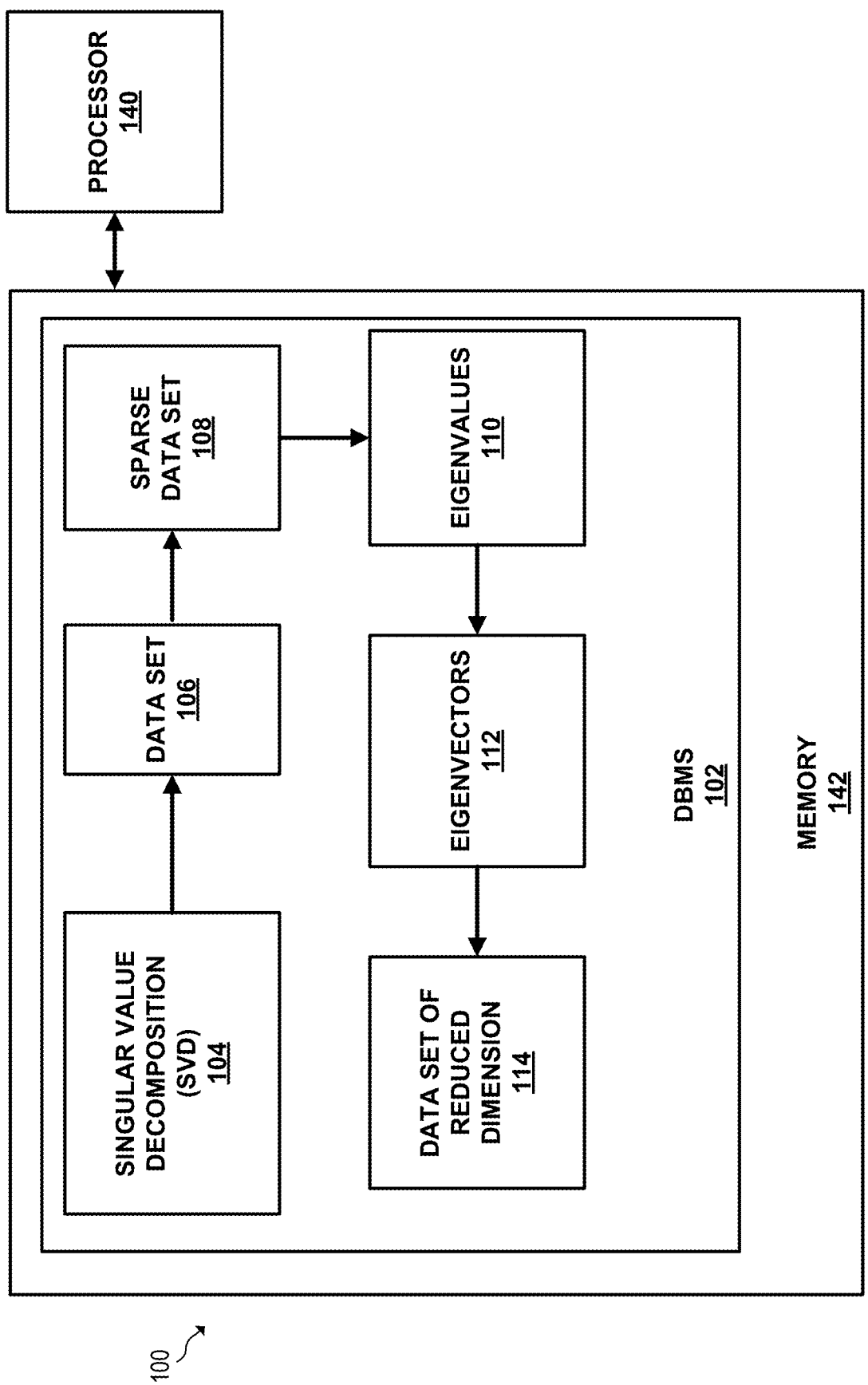
FIG. 1 is a block diagram of an example computing system for invoking singular value decomposition on a data set.

FIG. 1 is a block diagram of an example computing system 100 comprising a computing node for invoking singular value decomposition on a data set. Computing system 100 comprises memory 142 and processor 140. Processor 140 may comprise at least one of a central processing unit (CPU), graphics processing unit (GPU), application-specific integrated circuit (ASIC), field programmable gate array (FPGA), or the like. Processor 140 may execute database management system (DBMS) 102.

DBMS 102 resides at least in part in memory 142. DBMS 102 may comprise an application or platform that interacts with, hosts, and manages a database to capture and analyze data. For example, DBMS 102 may invoke singular value decomposition (SVD) 104 on a data set 106. Data set 106 may be stored in a database controlled by DBMS 102. Invoking SVD on the data set may reduce the dimensionality of the data set, which may allow further analytical processing. Data set 106 may comprise values stored in rows and/or columns of a table of DBMS 102.

To invoke SVD 104, DBMS 102 may transform data set 106 into a matrix, as will be described in greater detail herein. DBMS 102 may then "sparsify" the data set to produce a sparse data set 108. A sparse data set as defined herein is a data set comprising a matrix that is diagonalized (e.g. tri-diagonalized). The diagonalized matrix is a matrix in which only elements along the diagonal of the matrix have non-zero values. In some examples, DBMS 102 may sparsify data set 106 using a technique such as Lanczo's method. Lanczo's method is a technique for finding the most useful (e.g. largest magnitude) eigenvalues and eigenvectors of a linear system.

Responsive to generating the sparse data set 108, DBMS 102 may perform QR decomposition on sparse data set 108. QR decomposition is a technique that calculates the eigenvalues and eigenvectors of a matrix. Thus, using QR decomposition, DBMS 102 produces eigenvalues 110 and eigenvectors 112. Responsive to generating eigenvalues 110 and eigenvectors 112, DBMS 102 may multiply the eigenvectors against the matrix representation of data set 106 to produce data set of reduced dimension 114.

Figure 2:
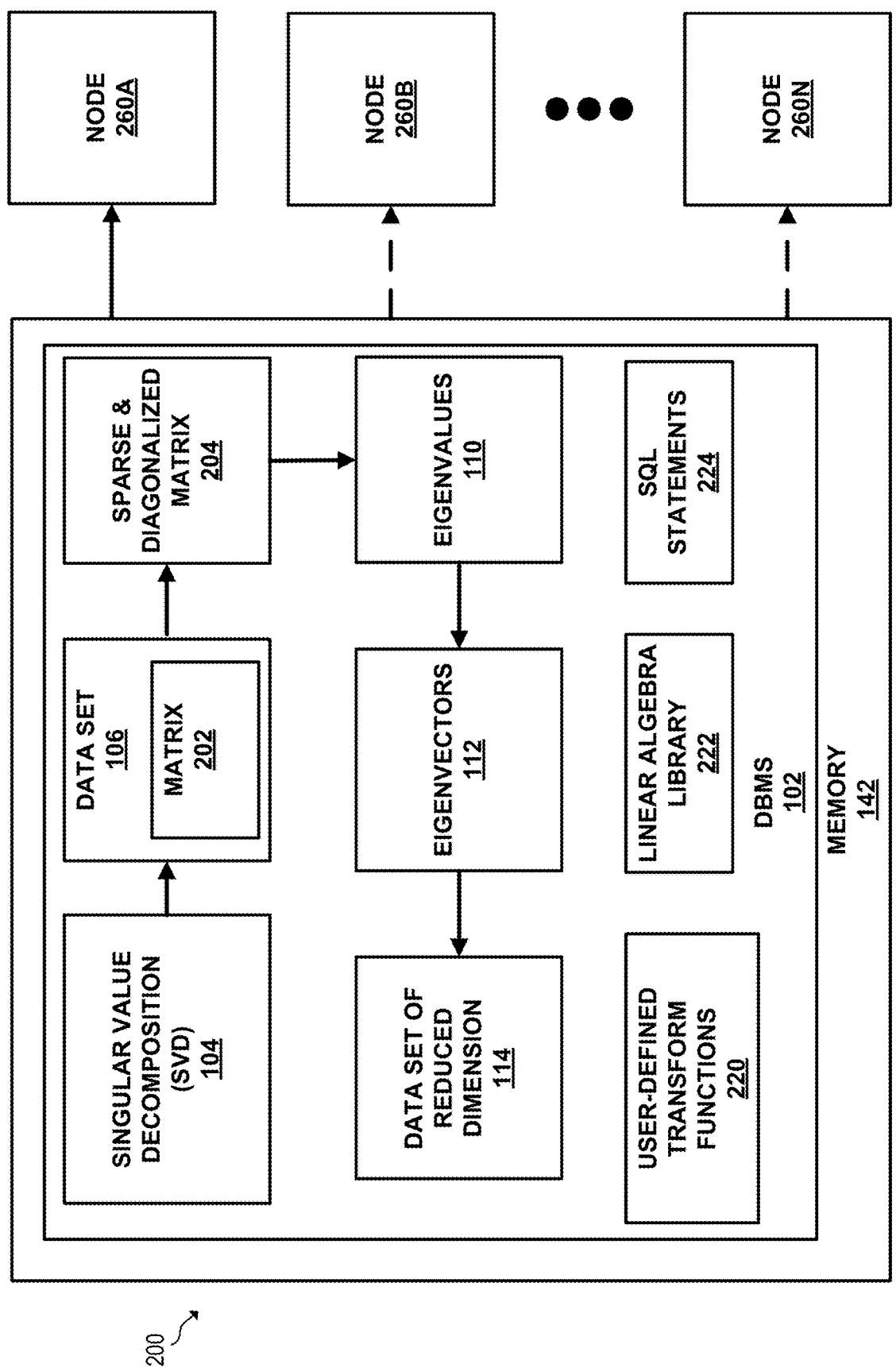
FIG. 2 is a block diagram of another example computing system for invoking singular value decomposition on a data set.

FIG. 2 is a block diagram of an example computing system for invoking singular value decomposition on a data set. FIG. 2 illustrates a computing system 200. Computing system 200 may be similar to computing system 100 of FIG. 1. DBMS 102 resides in memory 142. DBMS 102 executes on at least a node 260A and may executed in a distributed fashion on nodes 260B-260N (collectively "nodes 260"). Nodes 260A may each comprise a processor (e.g. a processor similar to processor 140), memory, storage, and may be communicatively coupled (e.g. via a network connection) with each other.

In the example of FIG. 2, the processor executes DBMS 102. DBMS 102 may invoke SVD 104 on data set 106. Data set 106 may comprise values stored in rows and columns of DBMS 102. DBMS 102 transforms data set 106 to a matrix 202. In some examples, DBMS 102 may have a limit on the maximum number of columns that a table may contain. In order to represent or construct matrix 202, the entire matrix may be stored in DBMS 102 in a single long binary column. In the case where the entire matrix is stored as a binary column, DBMS 102 may convert the binary column to the representation of matrix 202. In these examples, one or more of nodes 260 may utilize a user-defined transform function (e.g. one of user-defined transform functions 220) (UDFs) 220 to convert the column to matrix 202. UDFs 220 comprise external libraries written in programming languages, such as C++, R, Java or the like.

In other examples, DBMS 102 may represent each cell of matrix 202 as row of a table in DBMS 102. Each row may have 3 fields: a row ID, a column ID, and a cell value. In these examples, DBMS 102 may use a series of structured query language (SQL) statements 224 (e.g., a series of JOIN statements) on the tables comprising values of the matrix to construct matrix 202.

Responsive to constructing matrix 202, DBMS 102 may sparsify and diagonalize matrix 202 to produce sparse and diagonalized matrix 204. DBMS 102 may sparsify matrix 202 using Lanczo's method, as described above, to sparsify and diagonalize matrix 202. In various examples, DBMS 102 may employ UDFs 220 to perform Lanczo's method. UDFs 220 comprise external libraries written in programming languages, such as C++, R, Java or the like. For example, DBMS 102 may utilize a linear algebra library such as Eigen or the like to perform sparsification and diagonalization. In instances where DBMS 102 uses UDFs 220 to perform sparsification and/or diagonalization, DBMS 102 may perform the entire invocation of SVD 104 locally on a single compute node, e.g. Node 260A.

However, using UDF's 220 to perform sparsification and diagonalization may not perform well when the size of matrix 202 is too large. The performance of the sparisfiaction and diagonalization operations may degrade if matrix 202 cannot be stored completely in memory 142, i.e. completely in random access memory (RAM). In case where the size of matrix 202 is too large to use UDFs 220, DBMS 102 may perform sparsification and diagonalization using SQL statements. Using SQL statements to perform sparsification and diagonalization allows DBMS 102 to perform the sparsification and diagonalization in a distributed fashion across a plurality of nodes, e.g. nodes 260A-260N. In various examples, DBMS 102 may determine whether to perform sparsification and diagonalization locally in a distributed fashion based on a number of rows or columns in a table. For example, if the number of rows in a table is greater than 10,000 (or any other configurable threshold) or a number of dependent columns is greater than 10 (or any other configurable threshold), DBMS 102 may perform sparsification and diagonalization in a distributed fashion.

In various examples, DBMS 102 may determine to perform SVD 104 locally, or in a distributed fashion (i.e. using a plurality of nodes 260) based on a feature size of data set 106. A feature of data set 106 may be defined as a column of matrix 202. As an example, DBMS 102 may determine to perform SVD 104 in a distributed fashion using a plurality of computing nodes (e.g. using nodes 260) if a feature size (e.g., number of columns) of the data set is greater than a threshold value of features. DBMS 102 may determine to perform SVD 104 locally if a feature size of the data set is less than a threshold value of features.

In some examples, DBMS 102 may perform SVD 104 based on a percentage of features for which Eigen values are to be determined. If the percentage of features for which Eigen values are to be determined is greater than or equal to a threshold percentage, DBMS 102 may determine to perform SVD 104 in a distributed fashion. If the percentage of features for Eigen value determination is less than the threshold percentage, DBMS 102 may perform SVD locally.

In some examples, DBMS 102 may execute the following SQL and pseudo code to perform the sparsification and diagonalization in a distributed fashion. First, DBMS 102 may create tables in DBMS 102 for the sparsification and diagonalization operations as follows:

```
CREATE TABLE MatrixList(Row_Index, INT, Column_Index INT, Value FLOAT);
CREATE TABLE Qvec(Iteration INT, Row_Index INT, Value FLOAT);
CREATE TABLE Pvec(Iteration INT, Row_Index, INT, Value FLOAT);
CREATE TABLE Alpha_Beta(iteration, INT, Alpha FLOAT, Beta FLOAT);
Convert input table (m x n) to row ((mxn) x 3)
Initialize p0 as zero vector, q1 as unit-norm vector, beta0 as 0
```

The preceding SQL code causes DBMS 102 to create tables for a matrix of orthogonalized q vectors, a table of q vectors, and a table of alpha and beta values, which represent scalars along the bidiagonal of a bidiagonal.

Responsive to creating the tables, DBMS 102 may iteratively determine vectors and scale values as follows in the following two blocks of SQL and pseudo code:

```
INSERT INTO Pvec SELECT t.iter, t.rid, t.val - Alpha_beta.Beta * Pvec.value
FROM (SELECT iter, MatrixList.Row_Index rid,
SUM(MatrixList.Value * Qvec.Value) val
    FROM MatrixList, Qvec
    WHERE MatrixList.Column_Index = Qvec.Row_Index and
        Qvec.iteration=$((i))
    GROUP BY MatrixList.Row_Index) t, Alpha_Beta, Pvec
WHERE t.rid = Pvec.Row_Index and Alpha_Beta.iteration = i-1 and
Alpha_Beta.Iteration = Pvec.Iteration;
```

DBMS 102 may then execute the following pseudocode:

```
Calculate alpha_i as l2 norm of vector p_i;
Scale p_i by alpha_i
```

DBMS 102 may also execute the following SQL:

```
INSERT INTO Qvec SELECT t.iter, t.rid, t.val - Alpha_beta.Beta * Qvec.value
FROM (SELECT i+1 iter, MatrixList.Column_Index rid,
        SUM(MatrixList.Value * Pvec.Value) val
    FROM MatrixList, Pvec
    WHERE MatrixList.Row_Index = Pvec.Row_Index and
    Pvec.iteration=$((i))
    GROUP BY MatrixList.Column_Index) t, Alpha_Beta, Qvec
WHERE t.rid = Qvec.Row_Index and Alpha_Beta.iteration = i and
Alpha_Beta.Iteration = Qvec.Iteration;
``` and the following three lines of pseudocode:

```
Orthogonalize q_j+1 with respect to Qj;
Calculate beta_i+1 as l2 norm of vector q_i+1;
Scale q_i+1 by beat_i+1
```

In the above code examples, $p_i$ and $q_j$ are the Lanczos vectors calculated in each iteration, and alpha and beta are the scalars along the bidiagonal of bidiagonal matrix B, where the current iteration has value k.

Responsive to generating sparse and diagonalized matrix 204, DBMS 102 may perform partial orthogonalization to ensure numerical stability for sparse and diagonalized matrix 204. DBMS 102 may perform orthogonalization using the Gram-Schmidt process in various examples. Responsive to performing orthogonalization, DBMS 102 may perform iterative QR decomposition to determine eigenvalues 110 and eigenvectors 112. DBMS 102 may perform orthogonalization and QR decomposition using a combination of SQL statements 224, and UDFs 220 orchestrated by an external procedure that provides loop and conditional control.

Responsive to determining eigenvectors 112 and eigenvalues 110, DBMS 102 may determine which of eigenvectors 112 have large magnitudes. Large magnitude eigenvalues may indicate combination of attributes in data set 106 that have relevant information. Linear combinations of attributes are referred to as principal components. DBMS 102 may retain or drop principal components with corresponding Eigenvalues based on the magnitudes of the corresponding Eigenvalues. DBMS 102 may execute the equation (1) to reduce the set of principal components:

$$B = A_{m \times d} B_{k \times k}; k << n \qquad (1),$$

Where B is a matrix consisting of principal component vectors that correspond to the top K Eigenvalues. By reducing the set of principal components, DBMS 102 may reduce the dimension of data set 106 to obtain the data set of reduced dimension 114.

Figure 3:
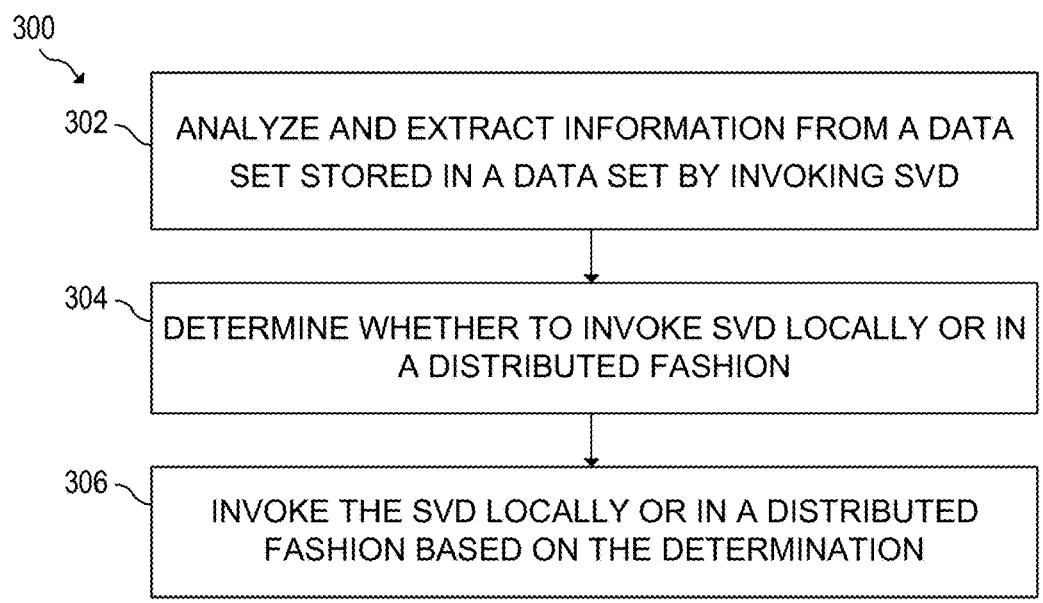
FIG. 3 is a flowchart of an example method for invoking singular value decomposition on a data set.

FIG. 3 is a flowchart of an example method for invoking singular value decomposition on a data set. FIG. 3 illustrates method 300. Method 300 may be described below as being executed or performed by a system, for example, system 100 of FIG. 1 or computing system 200 of FIG. 2. Other suitable systems and/or computing devices may be used as well. Method 300 may be implemented in the form of executable instructions stored on at least one machine-readable (e.g. a non-transitory) storage medium of the system and executed by at least one processor of the system (e.g. processor 140). Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

Method 300 may start at block 302 at which point a processor, such as processor 140 may cause DBMS 102 to: analyze and extract information from a data set (e.g. data set 106) stored in a database by invoking singular value decomposition (SVD) (e.g. singular value decomposition 104) on the data set.

To invoke SVD, DBMS 102 may execute blocks 304 and 306. At block 304, DBMS 102 may determine whether to invoke the SVD locally on a single node (e.g. node 206A), or in a distributed fashion using a plurality of computing nodes (e.g. nodes 206A-206N). At block 306, DBMS 102 may invoke the SVD locally or in the distributed fashion based on the determination.

Figure 4:
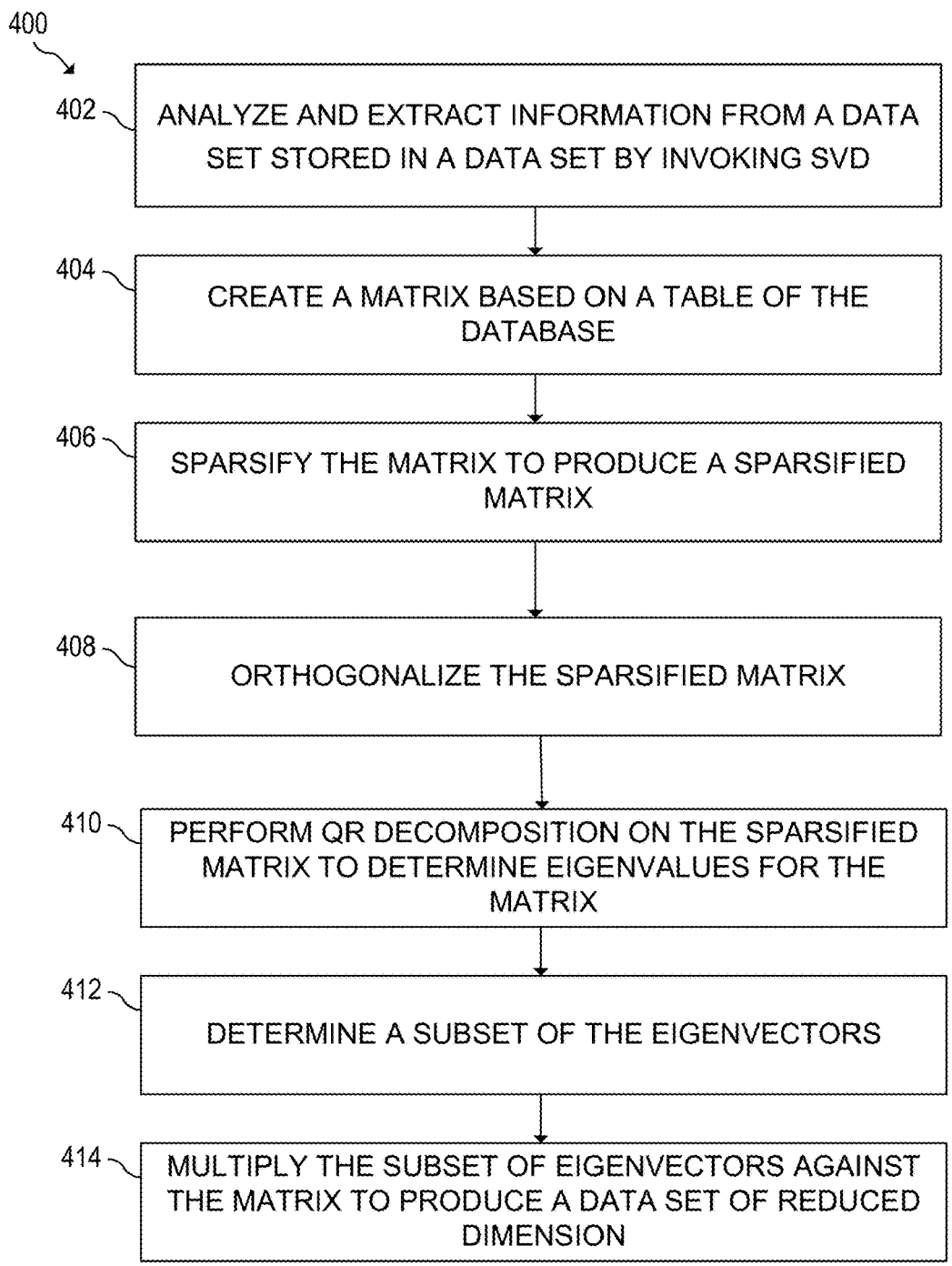
FIG. 4 is a flowchart of another example method for invoking singular value decomposition on a data set.

FIG. 4 is a flowchart of another example method for invoking singular value decomposition on a data set. Method 400 may be described below as being executed or performed by a system or device, for example, computing system 100 of FIG. 1 or computing system 200 of FIG. 2. Other suitable systems and/or computing devices may be used as well. Method 400 may be implemented in the form of executable instructions stored on at least one machine-readable storage medium of the system and executed by at least one processor (e.g. processor 140) of the system. Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

Method 400 may start at block 402 at which point a processor, such as processor 140, may cause DBMS 102 to: analyze and extract information from a data set (e.g. data set 106) stored in a database by invoking singular value decomposition (SVD) (e.g. singular value decomposition 104) on the data set.

At block 404, DBMS 102 may create a matrix 202 based on a table of data set 106. In various examples, DBMS 102 may create matrix 202 using SQL statements. As an example, block 404 may include retrieving a binary representation corresponding to the matrix representation from a column of the data set, and transforming the binary representation to create the matrix.

At block 406, DBMS 102 may sparsify the matrix to produce a sparse matrix. DBMS 102 may sparsify the matrix using Lanczo's algorithm. At block 408, DBMS 102 may orthogonalize the matrix (e.g. using the Gram-Schmidt process) before performing QR decomposition. At block 410, DBMS 102 may perform QR decomposition on the sparse matrix (e.g. sparse data set 108 or sparse & diagonalized matrix 204) to determine eigenvalues (e.g. eigenvalues 110) and eigenvectors (e.g. eigenvectors 112) for the matrix. In various examples, DBMS 102 may invoke the SVD using a SQL query, a user-defined transform function, or a linear algebra library. In some examples, to perform the QR decomposition, DBMS 102 may iteratively perform QR decomposition on the sparse matrix with SQL statements.

In some examples, the invoking the SVD may comprise sparsifying, with DBMS 102, the matrix to produce a sparse matrix. Sparsifying the matrix may comprise sparsifying the matrix using Lanczo's algorithm, and the method may further comprise performing, with the DBMS, QR decomposition on the sparse matrix to determine eigenvalues for the matrix.

At block 412, DBMS 102 may determine a subset of the eigenvectors, and at block 414, may multiply the subset of eigenvectors against the matrix to produce a data set of reduced dimension (e.g. data set of reduced dimension 114).

DBMS 102 may determine whether to invoke the SVD, e.g. some or all of blocks 402-414, locally on a single node (e.g. node 206A), or in a distributed fashion using a plurality of computing nodes (e.g. nodes 206A-206N). In various examples, DBMS 102 may determine whether to invoke SVD locally or in a distributed fashion based on at least one of: a size of a matrix created based on the data set (e.g. a size of matrix 202), or a percentage of desired features in the data set.

Figure 5:
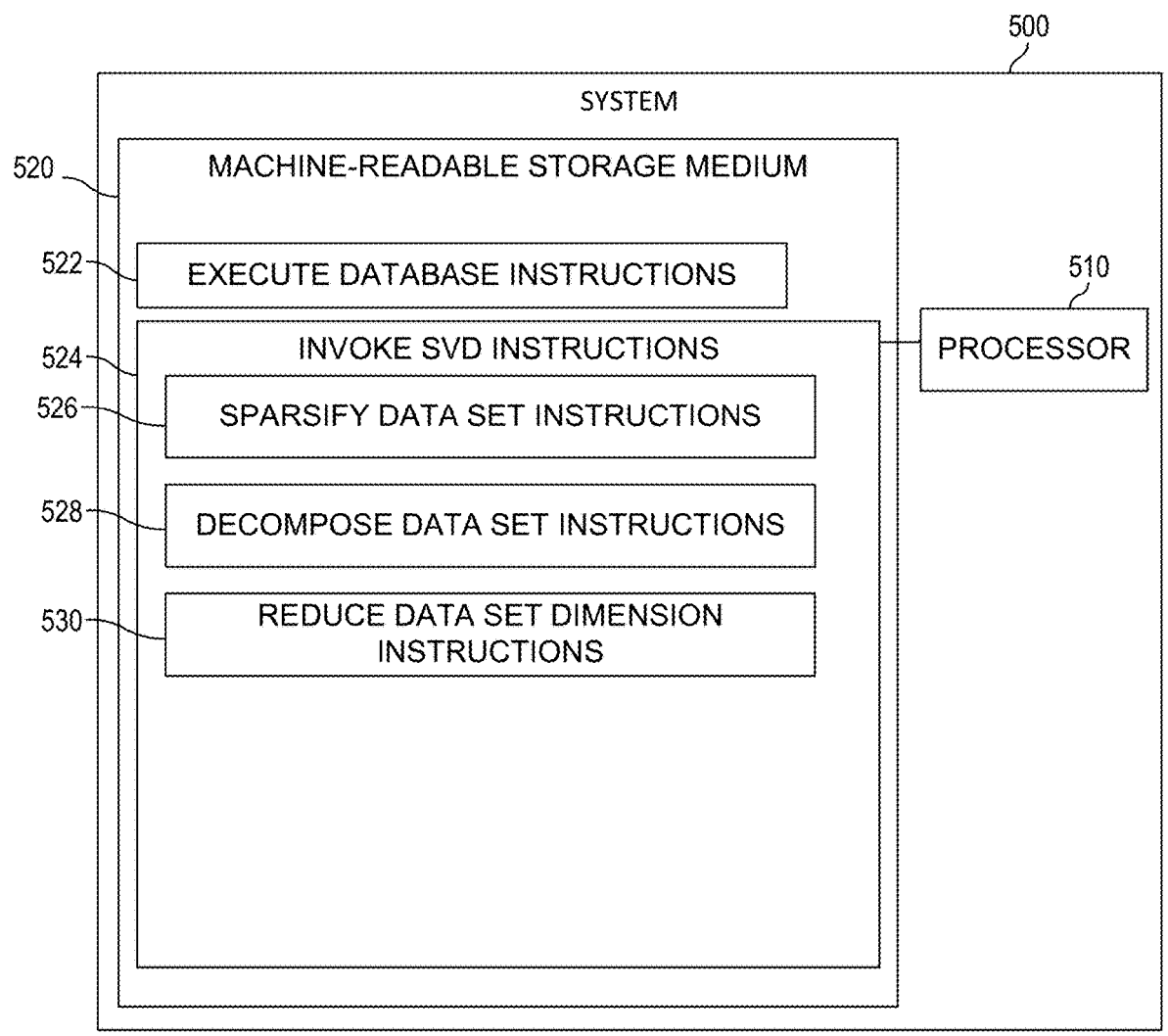
FIG. 5 is a block diagram of an example system for invoking singular value decomposition on a data set.

FIG. 5 is a block diagram of an example system for invoking singular value decomposition on a data set. System 500 may be similar to system 100 of FIG. 1 or system 200 of FIG. 2, for example. In the example of FIG. 5, system 500 includes a processor 510 and a machine-readable storage medium 520. Storage medium 520 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. In the particular examples shown in FIG. 5, processor 510 may fetch, decode, and execute instructions 522, 524, 526, 528, and 530 to invoke singular value decomposition on a data set. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions to allow migration of NVDIMMs.

Referring to FIG. 5, execute database instructions 522, when executed by a processor (e.g., 510), may cause processor 510 to execute a database (e.g. DBMS 102). Invoke SVD instructions 524, when executed, may cause processor 510 to invoke singular value decomposition on a data set (e.g. data set 106). Additionally, invoke SVD instructions 524 may further comprise instructions 526, 528, 530, 532. Sparsify data set instructions 526, when executed, may cause processor 510 to sparsify, with the database, the data set to produce a sparse data set (e.g. sparse data set 108).

Decompose data set instructions 528, when executed, may cause processor 510 to iteratively decompose, with the database, the data set to produce a set of eigenvalues (e.g. eigenvalues 110) and eigenvectors (e.g. eigenvectors 112). Reduce data set dimension instructions 530, when executed, may cause processor 510 to multiply with the database, the eigenvectors with the data set to produce a data set of reduced dimension (e.g. data set of reduced dimension 114).

Figure 6:
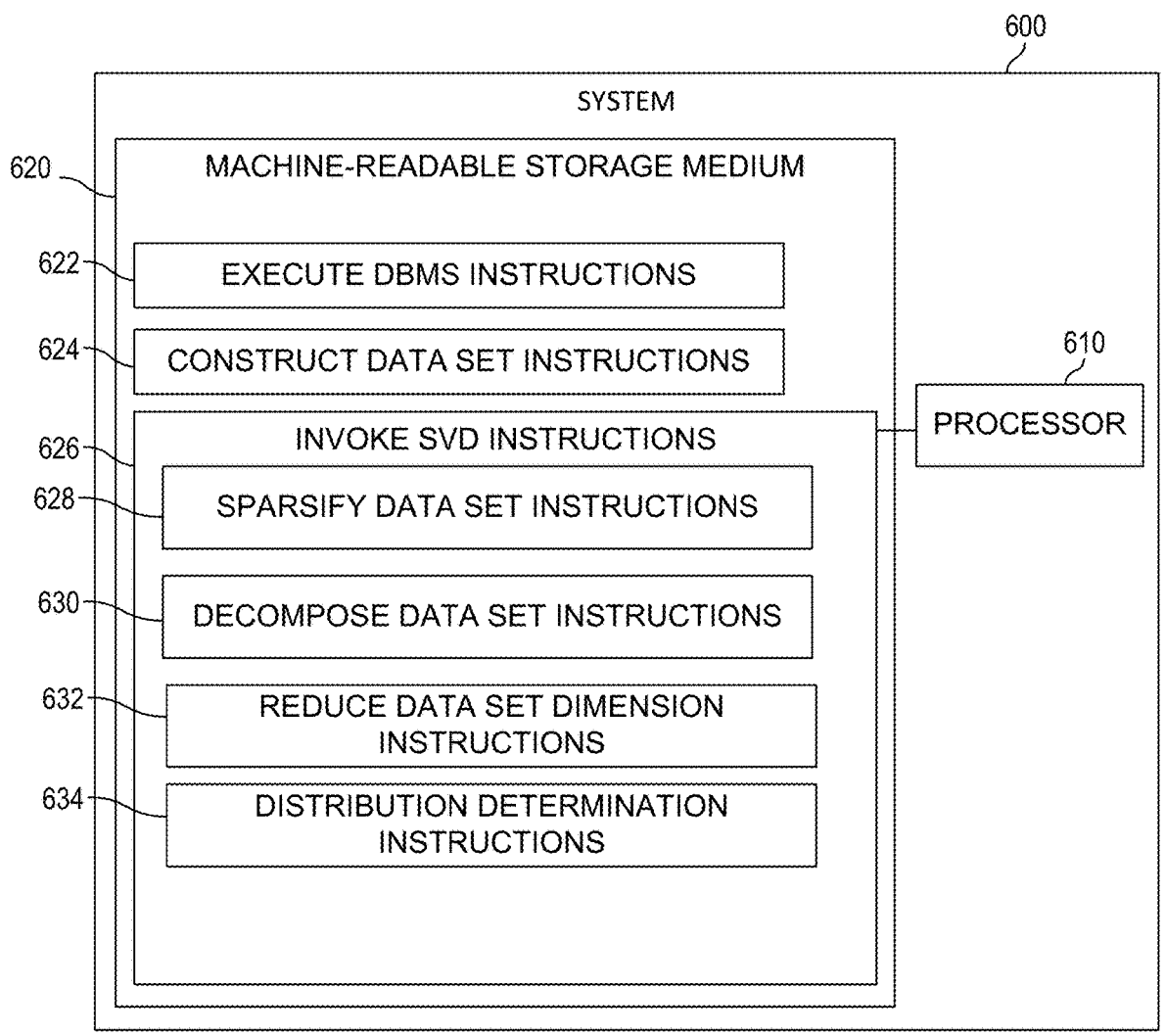
FIG. 6 is a block diagram of an example system for invoking singular value decomposition on a data set.

FIG. 6 is a block diagram of an example system for invoking singular value decomposition on a data set. System 600 may be similar to system 100 of FIG. 1 or system 200 of FIG. 2, for example. In the example of FIG. 6, system 600 includes a processor 610 and a machine-readable storage medium 620. Storage medium 620 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular examples shown in FIG. 6, processor 610 may fetch, decode, and execute instructions 622, 624, 626, 628, 630, 632, and 634 to invoke singular value decomposition on a data set. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions to allow migration of NVDIMMs.

Referring to FIG. 6, execute database instructions 622, when executed by a processor (e.g., 610), may cause processor 610 to execute a database (e.g. DBMS 102). Construct data set instructions 624, when executed, may cause processor 610 to construct, with the DBMS, the data set (e.g. data set 106) into a matrix (e.g. matrix 202). Processor 610 may construct the data set using a structured query language (SQL) query (e.g. one or more of SQL statements 224). In various examples, the data set comprising the matrix may be stored in rows and columns of the database. In some examples, processor 610 may construct, with the DBMS, the data set into a matrix using a structured query language (SQL) query.

Invoke SVD instructions 626, when executed, may cause processor 610 to invoke singular value decomposition on a data set (e.g. data set 106). Additionally, invoke SVD instructions 626 may further comprise instructions 628, 630, 632, and 634. Sparsify data set instructions 628, when executed, may cause processor 610 to sparsify, with the DBMS, the data set to produce a sparse data set (e.g. sparse data set 108).

Decompose data set instructions 630, when executed, may cause processor 610 to iteratively decompose, with the database, the data set to produce a set of eigenvalues (e.g. eigenvalues 110) and eigenvectors (e.g. eigenvectors 112). In some examples, processor 610 may iteratively perform the SVD using SQL statements executed by the DBMS.

Reduce data set dimension instructions 632, when executed, may cause processor 610 to multiply with the database, the eigenvectors with the data set to produce a data set of reduced dimension (e.g. data set of reduced dimension 114). In various examples, invoke SVD instructions 626 may cause processor 610 to invoke SVD using a structured query language (SQL) statement, a user-defined transform function, and a linear algebra library.

Distribution determination instructions 634, when executed, may cause processor 610 to determine whether to perform the SVD locally on a single computing node or to perform the SVD using a plurality of computing nodes. In some examples, processor 610 may determine whether to perform the SVD locally or using a plurality of computing nodes based on at least one of: a percentage of features in the data set or a threshold number of features in the data set.

The invention claimed is:

1. A method for invoking a singular value decomposition (SVD) on a data set by a database management system (DBMS), the method comprising:
   extracting, by a processor of the DBMS, information from the data set stored in a database of the DBMS;
   creating, by the processor of the DBMS, a matrix based on the data set, including:
      in response to a determination that a size of a feature of the data set is less than a threshold value, creating the matrix locally by the processor of the DBMS, or
      in response to a determination that the size of the feature of the data set is greater than the threshold value, creating the matrix, by the processor of the DBMS, in a distributed fashion across a plurality of nodes;
   generating, by the processor of the DBMS, a sparse matrix from the created matrix;
   determining, by the processor of the DBMS, eigenvectors from the sparse matrix; and
   multiplying, by the processor of the DBMS, the eigenvectors to the data set to generate a new data set of reduced dimension.

2. The method of claim 1, further comprising:
   performing, with the DBMS, a QR decomposition on the sparse matrix to determine eigenvalues.

3. The method of claim 1, wherein the size of the feature of the data set includes a size of a column of a table of the data set.

4. The method of claim 1, wherein creating the matrix in the distributed fashion across the plurality of nodes comprises creating the matrix using a structured query language (SQL) statement.

5. The method of claim 2, wherein creating the matrix locally by the processor of the DBMS comprises:
   retrieving a binary column of the data set using a user-defined transform function; and
   transforming the binary column of the data set into the matrix.

6. The method of claim 2, wherein performing the QR decomposition on the sparse matrix comprises:
   iteratively performing, with SQL statements executed by the DBMS, the QR decomposition on the sparse matrix.

7. The method of claim 1, wherein creating the matrix locally by the processor of the DBMS comprises:
   in response to a determination that a percentage of features for an eigenvalue determination is less than a threshold percentage, creating the matrix locally.

8. The method of claim 1, wherein creating the matrix in the distributed fashion across the plurality of nodes comprises:
   in response to a determination that a percentage of features for an eigenvalue determination is greater than a threshold percentage, creating the matrix, by the processor of the DBMS, in the distributed fashion across the plurality of nodes.

9. A database management system (DBMS) comprising a computing node, the computing node comprising:
   a processor; and
   a memory storing instructions that when executed cause the processor to:
      extract information of a data set stored in a database of the DBMS;
      create a matrix based on the data set, including causing the processor to:
         in response to a determination that a size of a feature of the data set is less than a threshold value, create the matrix locally by the processor of the DBMS, or
         in response to a determination that the size of the feature of the data set is greater than the threshold value, create the matrix in a distributed fashion across a plurality of nodes;
      sparsify, with the DBMS, the created matrix to produce a sparse matrix;
      produce a set of eigenvectors from the sparse matrix; and
      multiply, with the DBMS, the set of eigenvectors with the data set to produce a new data set of a reduced dimension.

10. The DBMS of claim 9, wherein, to create the matrix locally, the instructions are executable to cause the processor to:
    retrieve a binary column of the data set using a user-defined transform function; and
    transform the binary column of the data set into the matrix.

11. The DBMS of claim 9, wherein, to create the matrix in the distributed fashion across the plurality of nodes, the instructions are executable to cause the processor to: create the matrix in the distributed fashion across the plurality of nodes using a structured query language (SQL) statement.

12. The DBMS of claim 9, wherein the instructions are executable to cause the processor to: iteratively perform a QR decomposition on the sparse matrix to determine eigenvalues and the set of eigenvectors.

13. The DBMS of claim 9, wherein the size of the feature of the data set includes a percentage of features for which eigenvalues are determined, and the threshold value is a threshold percentage.

14. The DBMS of claim 9, wherein the size of the feature of the data set includes a size of a column of a table of the data set.

15. A non-transitory machine-readable storage medium of a database management system (DBMS) storing instructions that, when executed, cause a processor to:
    extract information of a data set stored in a database of the DBMS;
    create a matrix based on the data set, including causing the processor to:
       in response to a determination that a size of a feature of the data set is less than a threshold value, create the matrix locally by the processor of the DBMS, or
       in response to a determination that the size of the feature of the data set is greater than the threshold value, create the matrix in a distributed fashion across a plurality of nodes;
    sparsify, with the DBMS, the created matrix to produce a sparse matrix;
    generate a set of eigenvectors from the sparse matrix; and
    multiply, with the DBMS, the set of eigenvectors with the data set to produce a new data set of a reduced dimension.

16. The non-transitory machine-readable storage medium of claim 15, wherein the instructions are executable to cause the processor to:
   iteratively perform a QR decomposition on the sparse matrix to determine eigenvalues and the set of eigenvectors.

17. The non-transitory machine-readable storage medium of claim 16, wherein the size of the feature of the data set includes a percentage of features for which eigenvalues are determined, and the threshold value is a threshold percentage.

18. The non-transitory machine-readable storage medium of claim 15, wherein, to create the matrix in the distributed fashion across the plurality of nodes, the instructions are executable to cause the processor to: invoke the SVD using:
   create the matrix in the distributed fashion across the plurality of nodes using a structured query language (SQL) statement.

19. The non-transitory machine-readable storage medium of claim 15, wherein the size of the feature of the data set includes a size of a column of a table of the data set.

20. The non-transitory machine-readable storage medium of claim 15, wherein, to create the matrix locally, the instructions are executable to cause the processor to:
   retrieve a binary column of the data set using a user-defined transform function; and
   transform the binary column of the data set into the matrix.

* * * * *